March 8, 1932. S. W. NICHOLSON 1,848,539
WINDSHIELD REGULATOR
Filed April 19, 1926
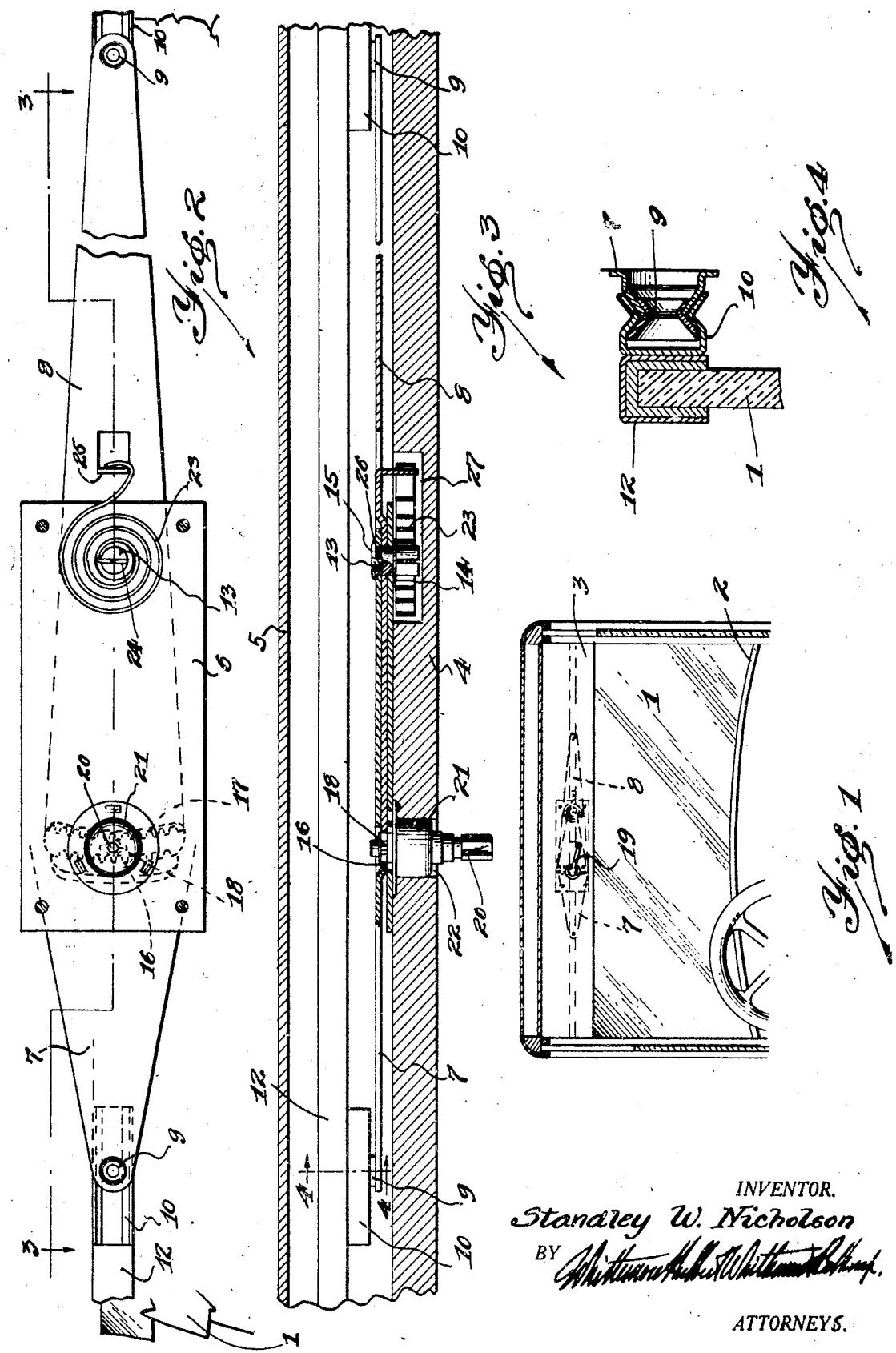
INVENTOR.
Standley W. Nicholson
BY
ATTORNEYS.

Patented Mar. 8, 1932

1,848,539

UNITED STATES PATENT OFFICE

STANLEY W. NICHOLSON, OF TOLEDO, OHIO, ASSIGNOR, BY MESNE ASSIGNMENTS, TO THE DURA COMPANY, OF TOLEDO, OHIO, A CORPORATION OF OHIO

WINDSHIELD REGULATOR

Application filed April 19, 1926. Serial No. 103,116.

The invention relates to mechanisms for raising and lowering closures of a vehicle body and refers more particularly to windshield regulators. One of the objects of the invention is to simplify the construction of the regulator so that its elements may be cheaply manufactured and assembled. Another object is to provide a compact regulator having the minimum thickness so that it may be readily installed and mounted upon a header with very little alteration of the latter. Further objects of the invention reside in the novel features of construction and combinations and arrangements of parts as more fully hereinafter set forth.

In the drawings:—

Figure 1 is a rear elevation of the cowl and windshield portion of a motor vehicle having applied thereto a windshield regulator embodying my invention;

Figure 2 is an enlarged rear elevation of the regulator;

Figure 3 is a cross section on the line 3—3 of Figure 2, showing the regulator mounted upon the header;

Figure 4 is a cross section on the line 4—4 of Figure 3.

As shown in the present instance, the regulator is operatively connected to the windshield 1, which normally closes the space between the cowl 2 and the header 3 of a motor vehicle body. The header has the spaced rear and front walls 4 and 5, respectively, between which the upper edge of the windshield extends.

For raising and lowering the windshield I have provided a regulator, which is mounted upon the rear wall 4 of the header and is operatively connected to the upper edge of the windshield at spaced points and is driven from the inner side of the header in advance of the steering wheel so that the driver of the motor vehicle may easily actuate the regulator. In detail, 6 is a sheet metal mounting plate which extends horizontally of and is secured to the front side of the rear header wall 4. 7 and 8 are overlapping sheet metal lifter arms co-pivotally mounted upon the mounting plate 6 and having their outer ends at opposite sides of the pivot operatively connected to the windshield 1 by suitable means such as the bearing members 9 secured to the arms and slidably engaging in the retainers 10 which latter are secured to the rear side of the channel 12 which embraces and is secured to the upper edge of the windshield. 13 is the pivot for the lifter arms. This pivot is in the nature of a pin which extends through the mounting plate near one end thereof and through the lifter arms, it having the collar 14 at the rear side of the plate and the turned over flange 15 at the front side of the lifter arm 7 for securing the lifter arms to the mounting plate.

For actuating the lifter arms in unison to raise or lower the windshield, I have provided upon the lifter arm 7 the rearwardly offset transversely extending arcuate rack 16 and upon the lifter arm 8 the transversely extending arcuate rack 17, which is located at an end thereof and in the same plane as the arcuate rack 16 but spaced therefrom. 18 is a gear or pinion located between these racks and meshing therewith, this pinion being driven from the crank 19 through the shaft 20 and suitable irreversible driving mechanism located within the casing 21. This casing is rigidly secured to the rear side of the mounting plate 6 and forms a bearing for the shaft 20 as well as the shaft carrying the gear or pinion. The crank is located at the rear side of the rear header wall 4 and this wall has the opening 22 for the passage of the casing 21. In order to provide for the equal movement of the bearings 9 upon the outer ends of the lifter arms, it is necessary to compensate for the difference in radii of the arcuate racks 16 and 17 and this is accomplished by locating the pivot for these lifter arms nearer the bearing member 9 of the lifter arm 8 than the bearing member 9 of the lifter arm 7.

For the purpose of counterbalancing the weight of the windshield, I have provided the spiral spring 23 which is connected at one end to the lifter arm 8 and at the other end to the lifter arm 7. As shown this spiral spring surrounds that portion of the pivot 13 extending beyond the collar 14 in rear of the mounting plate and has its inner end extending through the transverse slot 24 in the pivot and its outer end hooked to engage the tongue 25 struck out from the lifter arm 8. It will thus be seen that this spiral spring exerts equal force upon both of the lifter arms and operates to counterbalance the weight of the windshield. The pivot 13 is non-rotatably secured to the lifter arm 7 as by means of the serrations 26 upon the pivot engaging in corresponding serrations in the wall of the opening through which the pivot extends. To accommodate the spiral spring as well as the rearwardly extending portion of the pivot, the rear wall 4 of the header is formed with the recess 27 in its front face.

What I claim as my invention is:

1. A regulator for actuating a closure comprising a pair of overlapping lifter arms, a pivot engaging one of said arms at one end thereof and the other of said arms intermediate its ends, means upon said arms at opposite sides of said pivot for operatively connecting said arms to said closure and a single member engaging said arms for actuating the same in unison.

2. A regulator for actuating a closure comprising a pair of lifter arms, a single pivot for said arms engaging one arm at an end thereof and the other arm intermediate its ends, means at opposite sides of said pivot for operatively connecting said arms to said closure and a rotatable member engaging the first mentioned arm intermediate its ends and the second mentioned arm at an end for actuating said arms in unison.

3. A regulator for actuating a closure comprising a pair of co-pivotal lifter arms operatively connected to said closure, one of said arms having a transverse arcuate rack intermediate its ends and the other of said arms having a transverse arcuate rack at one of its ends, a single pivot engaging the first mentioned arm at one end and the second mentioned arm intermediate its ends and a gear meshing with said racks.

4. A regulator for actuating a closure comprising a pair of co-pivotal lifter arms operatively connected at opposite sides of the pivot to said closure, means spaced from and in substantially the same horizontal plane as the pivot and engaging said arms to actuate the same in unison and a spiral spring surrounding the pivot and connected to each of said arms to counterbalance the weight of the closure.

5. A regulator for actuating a closure comprising a pair of co-pivotal lifter arms operatively connected to said closure, one of said arms having a transverse arcuate rack intermediate its ends and the other of said arms having a transverse arcuate rack at one of its ends, and a gear meshing with said racks.

6. A regulator for actuating a closure, comprising a pair of co-pivotal lifter arms operatively connected at opposite sides of the pivot to said closure, and means including a single actuating element engaging said arms for angularly moving the same about their pivot to actuate said closure.

7. A regulator for actuating a closure, comprising a pair of pivotally mounted lifter arms operatively connected to said closure, and a spring having its opposite ends connected respectively to said arms for counterbalancing the weight of said closure.

8. A regulator for actuating a closure comprising a pair of co-pivotal lifter arms operatively connected to said closure on opposite sides of the pivot and means for actuating said lifter arms in unison, said means being spaced from the pivot and lying in a horizontal plane passing through the axis of the pivot.

9. A regulator for raising and lowering a closure comprising a mounting plate, a pair of co-pivotal lifter arms mounted upon said mounting plate and operatively connected at opposite sides of the pivot to said closure, means for actuating said lifter arms in unison, said means being spaced from the pivot and lying in a horizontal plane passing through the axis of the pivot, and means for counterbalancing the weight of the closure, said lifter arms, actuating means and counterbalancing means being mounted as a unit upon said mounting plate.

10. A regulator for actuating a closure comprising a pair of co-pivotal lifter arms, said arms being operatively connected to said closure on opposite sides of the pivot, and means spaced from and at one side of said pivot for actuating said arms in unison.

11. A regulator for actuating a closure, comprising a pair of co-pivotal lifter arms operatively connected at opposite sides of the pivot to said closure, said arms having arcuate racks and a gear member meshing with said racks for actuating said arms.

12. In a window regulator, a pair of sector gears, one internal and the other external, arms connected to the gears for raising and lowering the window, a pinion meshing with the said gears for rotatably moving the arms in opposite directions the same angular distance when the pinion is rotated in one direction, and a yielding means connected to the sectors for yieldingly resisting the movements of each of the sectors in one direction and counterbalancing the weight of the window.

13. In a window regulator, a pair of sector gears, one internal and the other external and having the same number of teeth per degree and rotatable about a common axis, arms connected to the gears for raising and lowering the window, and a pinion meshing with the said gears for rotatably moving the arms in opposite directions when the pinion is rotated in one direction, the ends of the arms operatively connected to a window for raising and lowering the window by the movement of the arms.

14. In an operating device for vertically movable window panels, a fixed mounting plate, actuating levers pivotally supported as upon a common pivot pin upon the plate at the vertical center of the window panel and each embodying a sector gear portion and an arm portion, said arm portions having sliding contact with the panel at points to each side of the vertical center of the panel, spring means connected with the levers and normally acting to urge the panel upwardly, and an operating means including a pinion operatively engageable with said sector gear portions for simultaneously imparting swinging movement to the levers in opposite directions upon rotation of the pinion.

15. In an operating device for vertically movable window panels having a rest bar provided at their lower edge, a fixed mounting plate, a pivot pin carried by the plate, an actuating lever pivotally mounted on the pin including a spur sector gear portion and arm portion having contact with the rest bar at one side of the vertical center of the panel, a second actuating lever pivotally mounted on the pivot pin including an internal sector gear portion and an arm portion having sliding contact with the rest bar at the opposite side of the vertical center of the panel from that of said first mentioned lever arm, a pinion engageable with the teeth of both of said sector gear portions, and means for imparting rotation to said pinion for imparting rotation to said pinion for imparting swinging movement to the actuating levers in opposite directions.

In testimony whereof I affix my signature.

STANLEY W. NICHOLSON.